UNITED STATES PATENT OFFICE.

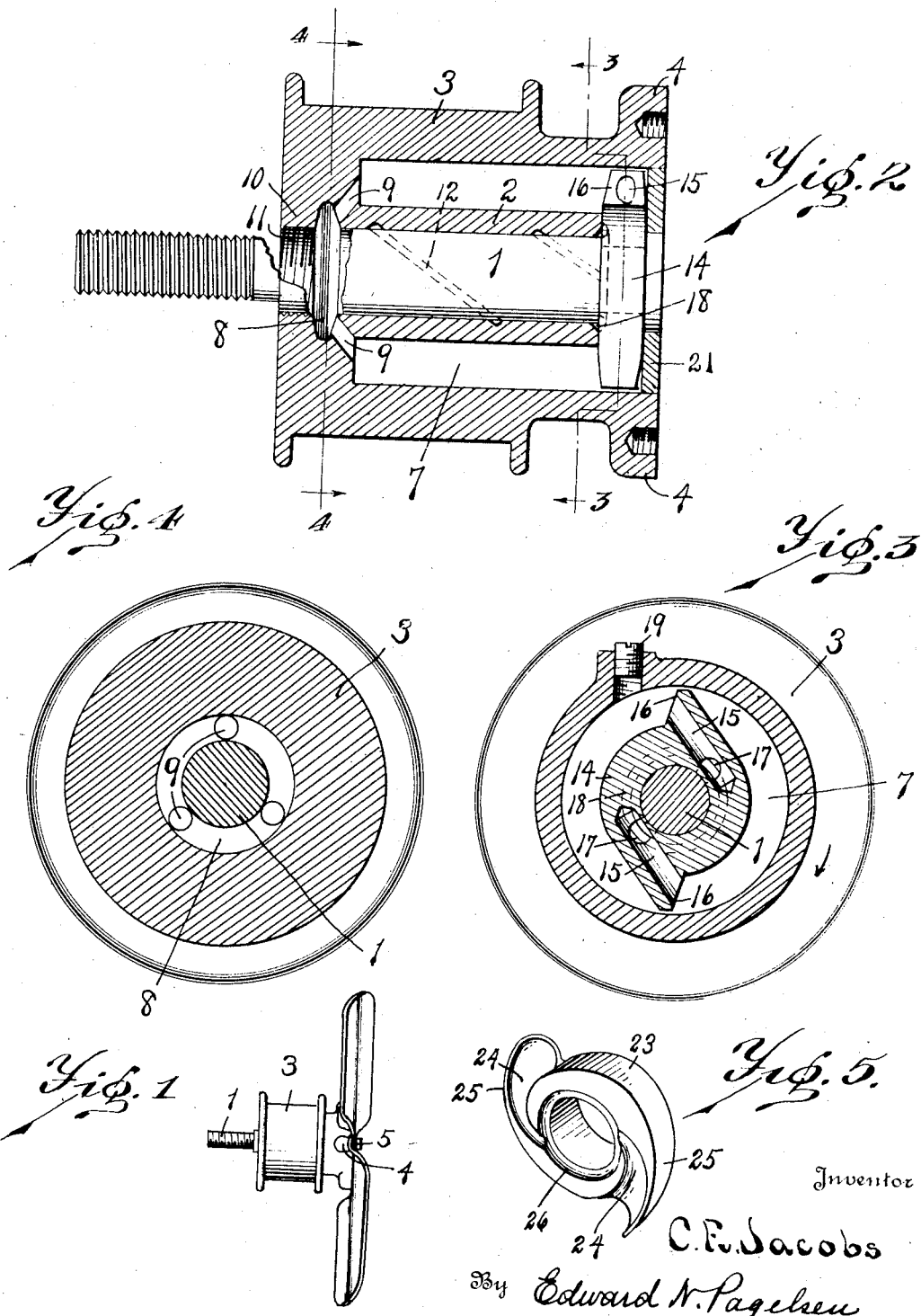

CLARENCE E. JACOBS, OF DETROIT, MICHIGAN.

LUBRICATOR.

1,369,110.                Specification of Letters Patent.      Patented Feb. 22, 1921.

Application filed April 2, 1920. Serial No. 370,660.

*To all whom it may concern:*

Be it known that I, CLARENCE E. JACOBS, a citizen of the United States, and residing at Detroit, in the county of Wayne and State of Michigan, have invented a new and Improved Lubricator, of which the following is a specification.

This invention relates to the mounting of rotatable members, particularly pulleys, upon stationary shafts, and its object is to provide the rotatable member with an oil receptacle and with oil grooves so arranged as to conduct lubricants along the entire length of the bearing surfaces.

This invention consists in combination with a supporting shaft, of a rotatable member mounted thereon and provided with a circumferential oil receptacle and with an oil groove extending along longitudinally of the bearing surface, being preferably helical and extending around within the bearing surface of the rotatable member, and an oil intercepter rigidly mounted on the shaft and provided with oil passages through which the oil will be forced to the helical oil groove by the impact of the oil when the rotating member has attained a predetermined speed.

It further consists in forming a circumferential oil groove at the end of the bearing surface of the exterior member opposite to the oil intercepter and in providing passages connecting this oil groove with the circumferential oil receptacle.

It also consists in providing a helical oil passage between the end of the rotating member and the said circumferential oil groove, the direction of this passage being opposite to that of the helical passage in the bearing of this rotating member.

It also consists in the details of construction illustrated in the accompanying drawing and particularly pointed out in the claims.

In the drawing, Figure 1 is an elevation of a fan, a pulley connected thereto, and a shaft on which the fan and pulley are mounted. Fig. 2 is a longitudinal central section of a fan pulley and an elevation of a shaft on which the pulley is mounted. Figs. 3 and 4 are sections on the lines 3—3 and 4—4 of Fig. 2. Fig. 5 is a perspective showing a modification of the oil intercepter.

Similar reference characters refer to like parts throughout the several views.

The shaft 1 shown in the drawing is preferably of uniform diameter throughout the length of the hub 2 of a fan pulley 3, which is preferably formed with lugs 4 which are provided with threaded holes adapted to receive the screws 5 which hold the fan in position on the pulley. Within the pulley and surrounding this hub 2 is an annular oil receptacle 7 which connects at the end opposite the fan with a circumferential groove 8 by means of the passages 9. The end 10 of this fan pulley outside the groove 9 is provided with a helical groove in the form of an ordinary thread, while the bearing surface of the hub 2 of this pulley is provided with another helical passage 12 which turns in the opposite direction from the helical groove 11.

Connected to the outer end of the shaft 1 is a head or oil intercepter 14, shown in cross section in Fig. 3, which has inclined passages 15 extending from the intercepting surfaces 16 to the short longitudinal passages 17. These passages 17 connect with a circumferential groove 18, shown in dotted lines in Fig. 2, formed partly in the intercepter 14 and partly in the end of the hub 2 of the pulley. The receptacle 7 which constitutes the oil receptacle may be filled by removing the screw 19.

When the oil receptacle 7 has been filled and the pulley is rotated in the direction of the arrow in Fig. 3, the lubricant will be carried around with the pulley and will be thrown with considerable force against the intercepting surface 16 and therefore be forced down through the inclined passages 15 and the small transverse passages 17 into the circumferential passage 18, which constitutes a small reservoir surrounding the shaft 1. The helical groove 12 around the inside of the hub 2 connects at one end with this circumferential reservoir 18 and as the lubricant therein is under pressure, it will be forced along this helical passage 12. In view of the fact that the rotation of the pulley is in such a direction that this helical passage 12 acts as a screw of Archimedes, the lubricant will be carried along the shaft 12 to the circumferential groove 8, from which the lubricant will be moved outwardly by centrifugal force through the passages 9 into the reservoir 7, from which it again flows down through the passages 15. There will be thus a continuous flow of lubricant along the shaft 1 from one end of the hub 2 to the other and every portion of the bearing will be thoroughly lubricated.

Because of the reverse direction of the helical groove 11 in the end of the pulley opposite the intercepter 14, any lubricant which may tend to pass out in that direction will be carried back to the circumferential groove 8. The endwise movement of the pulley on the shaft 1 may be prevented by means of the intercepter 14 engaging the end of the hub 2 and by means of the bearing or thrust washer 21 which fits into the open end of the bore of this pulley as shown in Fig. 2. The fan blades may be secured against the lugs 4 and against the thrust washer 21 by means of the screws 5 and thus prevent any leakage at that end. Instead of the intercepter 14 shown in Figs. 2 and 3, the device shown in Fig. 5 may be secured to the end of the shaft. The body 23 of this oil conductor has helical grooves 24 in the buckets 25 which grooves connect with the circular groove and receptacle 26 for the lubricant. Because of the form of the grooves 24, lubricant carried around by the pulley will be conducted to the receptacle 26 from which it will flow through the groove 12.

The sizes and proportions of the various parts of this lubricator may all be changed by those skilled in the art without departing from the spirit of my invention as set forth in the following claims.

I claim:—

1. The combination of a shaft and a member rotatably mounted thereon and provided with an annular oil receptacle and having a helical oil groove in its bearing surface, and an oil intercepter mounted on the end of the shaft within the oil receptacle and having radial extensions provided with passages through which lubricant may flow from said receptacle to one end of said helical oil groove, said rotatable member having a passage extending from the opposite end of said helical groove to said annular receptacle.

2. The combination of a stationary shaft and a member rotatable thereon and provided with an annular oil receptacle and with a helical oil groove in the surface engaging the shaft, a head on one end of said shaft and having a lubricant passage extending from the circumference of said shaft and opening into said annular receptacle so as to receive lubricant carried around by the rotatable member, said rotatable member having two circumferential grooves around said shaft, one adjacent the head on the shaft and another at the opposite end of the helical groove, and also having radial passages connecting the second groove to said annular oil receptacle.

3. The combination of a stationary shaft and a member rotatable thereon and provided with an annular oil receptacle and with a helical oil groove in the surface engaging the shaft, a head on one end of said shaft and having a lubricant passage extending from the circumference of said shaft and opening into said annular receptacle so as to receive lubricant carried around by the rotatable member, said rotatable member having two circumferential grooves around said shaft, one adjacent the head on the shaft and another at the opposite end of the helical grooves, and also having radial passages connecting the second groove to said annular oil receptacle, the end of said rotatable member outside of the second groove having a helical groove connecting to said second circumferential groove, said helical grooves extending in opposite directions around the shaft.

CLARENCE E. JACOBS.